June 18, 1929.  M. B. MONSON  1,717,804
PLOW
Filed Jan. 28, 1928    2 Sheets-Sheet 1
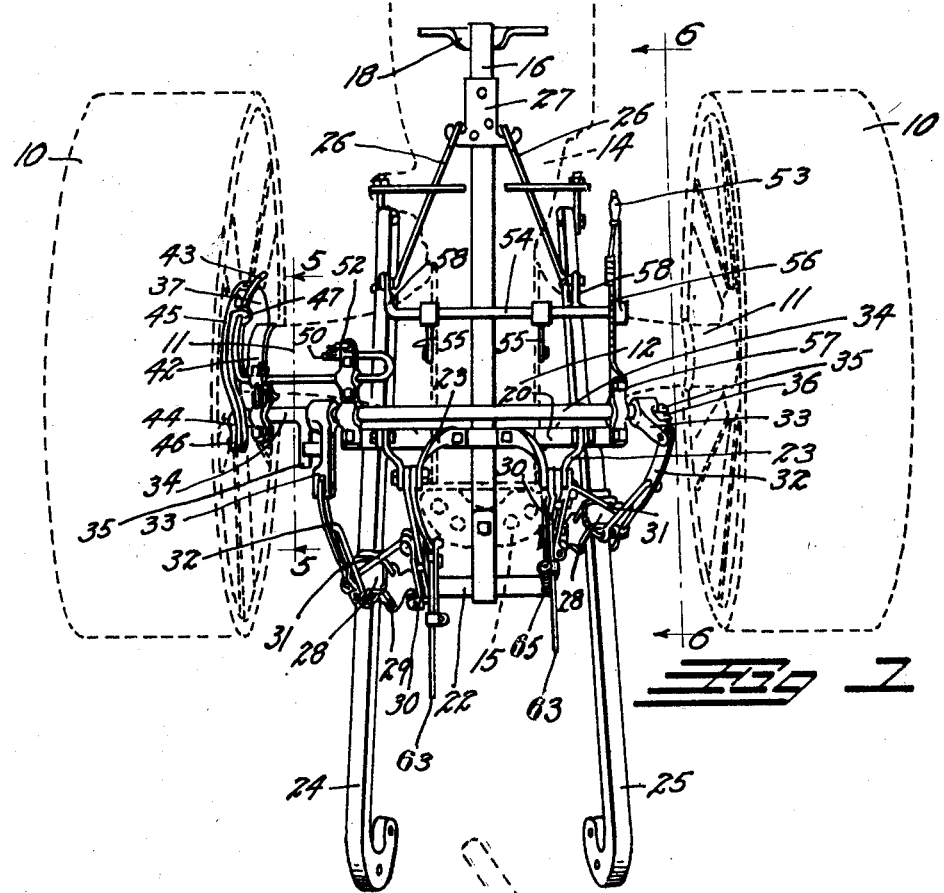
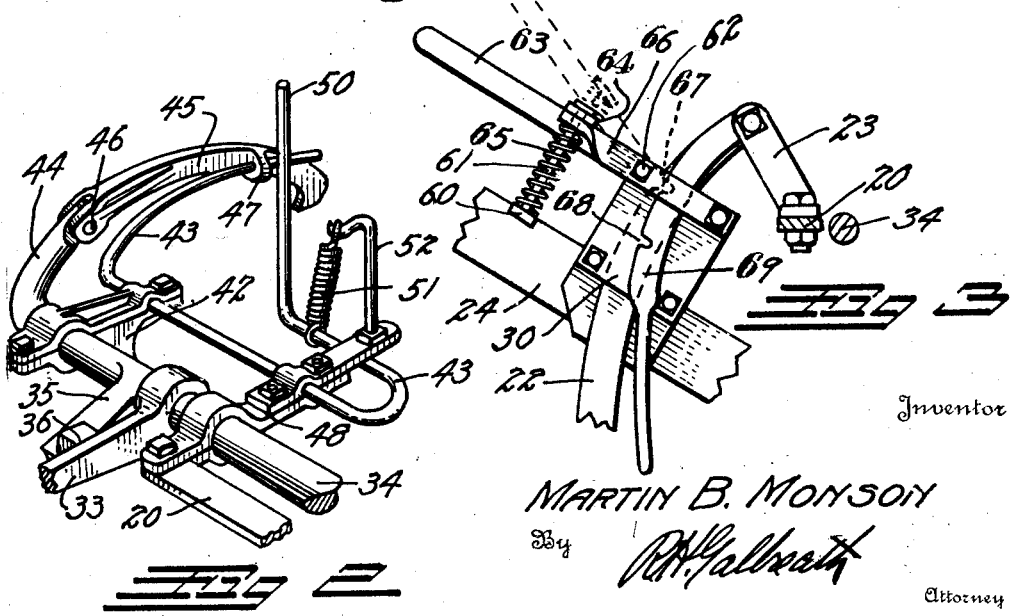
Inventor
MARTIN B. MONSON
By
Attorney

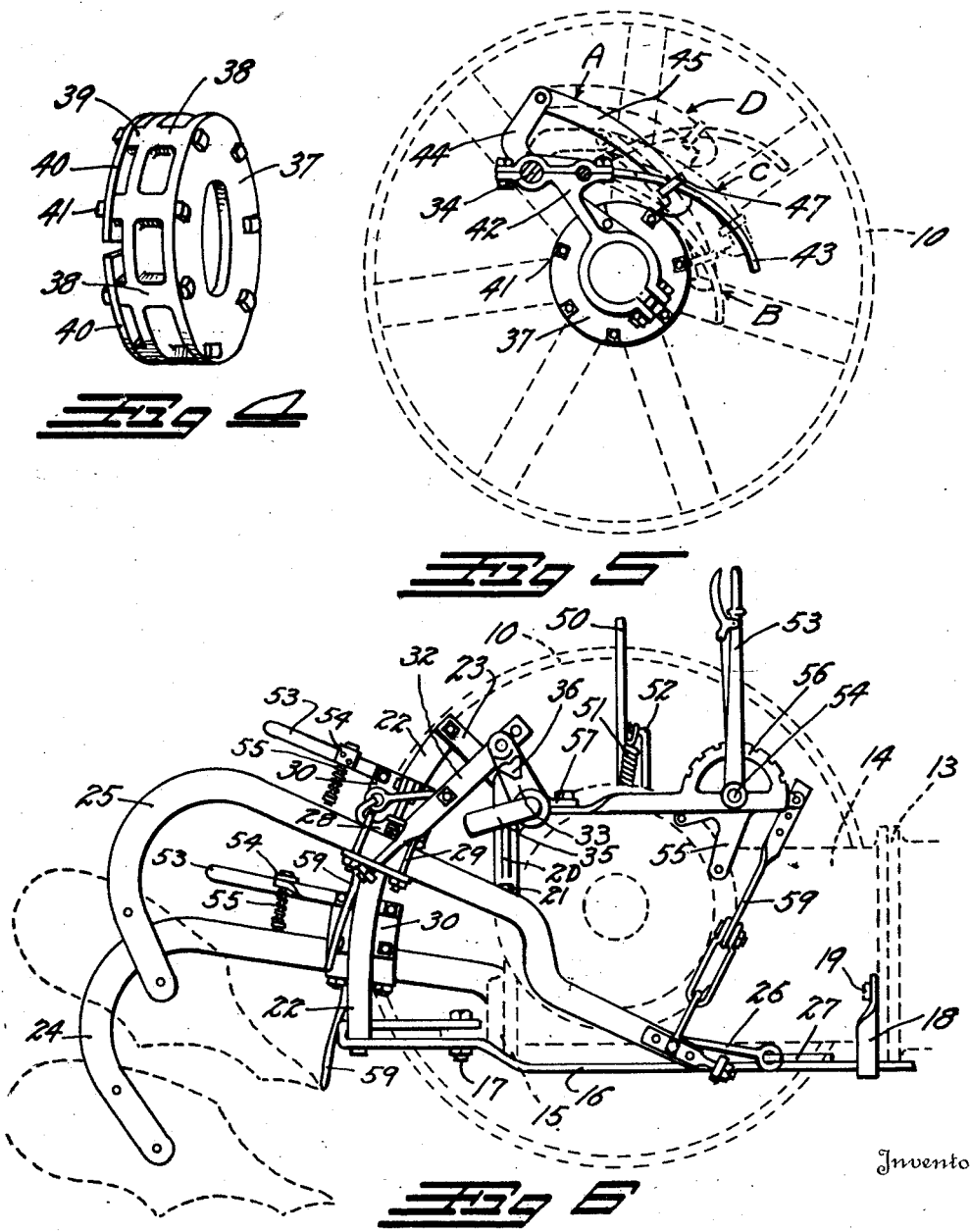

Patented June 18, 1929.

1,717,804

UNITED STATES PATENT OFFICE.

MARTIN B. MONSON, OF WHEATRIDGE, COLORADO, ASSIGNOR TO MORO PLOW & MANUFACTURING COMPANY, OF ARVADA, COLORADO, A CORPORATION OF COLORADO.

PLOW.

Application filed January 28, 1928. Serial No. 250,142.

This invention relates to a plow of the type adapted to be entirely supported by a tractor. The invention is especially designed as an improvement over the plow illustrated and described in applicant's Patent No. 1,670,270, issued May 15, 1928.

The principal object of this invention is to construct a two-way plow in which the plow not to be used may be raised from the ground by the tractor power without manual exertion.

Another object of the invention is to provide an efficient mechanism which will maintain the raised plow in its elevated position and which can be easily operated to drop the required plow after the other plow has been raised the inactive position.

A further object of the invention is to provide an efficient manually operated adjustment for the plowing depth.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a top, perspective view of the invention applied to a tractor of the "Fordson" type. In this view the tractor is illustrated in phantom with broken lines.

Fig. 2 is a detail perspective view illustrating the construction of the plow elevating pawl.

Fig. 3 is a detail side elevation of the plow supporting latch.

Fig. 4 is a perspective view of the toothed drum which is attached to the tractor wheel for elevating the plow.

Fig. 5 is a cross-section taken on a line 5—5, Fig. 1, illustrating the action of the plow elevating pawl.

Fig. 6 is a similar cross section taken on the line 6—6, Fig. 1 illustrating the invention in side elevation.

The invention is designed to be entirely supported by the tractor and has no supporting wheels of any nature embodied in the plow. It is designed so that it can be quickly and easily attached to the tractor by employing the bolts and attachments which are already embodied in the tractor mechanism.

The mechanism is of the type known as a "two-way" plow that is, it is of the type designed to carry both a right and left hand plow share. Both of the plows are elevated at the end of the furrow while the tractor is being turned and the proper plow is then dropped into position for the return furrow.

In the drawings, various parts of the tractor are indicated by numerals as follows: tractor wheels 10, rear axle housing 11, differential gear case 12, crank case flange 13, transmission housing 14, and draw bar cap 15.

The invention is attached to the tractor by securing a fixed bar 16 to the draw bar cap 15 by means of a bolt 17. The forward extremity of the fixed bar 17 is supported in a yoke 18 which is secured to the crank case flange 13 of the tractor by means of the crank case flange bolts 19 which are already in place on the tractor. A fixed cross frame 20 is secured above and rearwardly of the differential housing 12 by means of the differential housing bolts 21 of the tractor.

The left and right plow beams are illustrated at 24 and 25 respectively. The plow beams 24 and 25 are drawn by means of a pair of draw bars 26, each of which is linked to one side of a T shaped draw bar fitting 27 that is secured to the fixed bar 16. This construction provides a universal pivot for the forward extremities of the plow beams.

Adjacent their mid-portions, the plow beams are carried in plow guide clamps 28, each of which comprises an upper and lower plate clamped together by means of U-bolts 29. The lower plate of each clamp is hinged to a slide 30. As the plows are raised or lowered, the slides 30 slide along arcuate arms of a U-shaped plow guide 22 which extend upwardly from the bar 16 and terminate at their upper extremities on brackets 23 on the cross frame 20. The upper plate of each clamp is secured by means of a diagonal brace 31 to the top of one of the slides 30. The brace 31 is adjustable in length and acts to regulate and adjust the vertical angle of the plow by swinging the top of the plow beam outwardly or inwardly as desired.

The plow beams are lifted by means of links 32 which connect at their lower extremities with the lower plates of the clamps 28 and at their upper extremities with loose levers 33 which are free to rotate upon a plow lift shaft 34 which is carried in brackets from the cross frame 20. The plow lift shaft 34 carries two parallel lifting arms 35 one of which extends adjacent each of the lifting levers 33 so as to contact with projections 36 upon the latter.

The plow lift shaft 34, is rotated by the rotation of the tractor wheels 10 by means of the following mechanism: A drum 37 is secured to one of the tractor wheels, 10 preferably the left wheel as illustrated. The drum 37 comprises two separated discs joined by means of, what might be termed, teeth 38. On the outer face of the outer disc, projections 39 are formed, which are spaced so as to pass between the spokes of the tractor wheel. On the inside of the tractor wheel two semi-circular plates 40 are secured to the projections 39 by means of bolts 41 and act to clamp the drum 37 to the wheel so that it will revolve therewith.

On the rear axle housing 11, adjacent the drum a bracket 42 is secured which supports one extremity of the plow shaft 34 and also supports a spring lever 43. The extremity of the plow lift shaft 34 is turned at an angle to form a lever 44, on the extremity of which, a hook shaped pawl 45 is hinged at 46. One extremity of the spring lever 43 is carried and passes through an ear 47 on the pawl 45. The other extremity of the spring lever 43 is carried in a bracket 48 from the cross frame 20, which also supports the plow lift shaft 49. This latter extremity of the spring lever is bent so as to return parallel to itself under the bracket 48 and then extends upwardly to form a pawl engaging lever 50. A spring 51 extends between the spring lever 43 and a spring post 52 and acts to constantly maintain the spring lever against the bottom of the bracket 48. The pawl 45 is arranged directly over the teeth 38 in the drum 37.

Let us assume that the left hand plow beam 24 is down so that its plow is in engagement with the ground, as illustrated in Fig. 1, and that it is desired to lift this plow. The pawl 45 is now in the position indicated at "D", Fig. 5. The operator forces the pawl engaging lever 50 forwardly against the action of the spring 51, this causing the extremity of the spring lever 43 to force the pawl 45 downwardly so that its hooked-shaped extremity will pass into the drum 37 between two of the teeth 38, as indicated by position "A", Fig. 5. The rotating drum will cause one of the teeth 38 to engage the bolt 45, the friction of the engagement acting to maintain the pawl in place after the lever 50 has been released. As the drum rotates it will draw the pawl forwardly and the pawl in turn will draw the lever 44 forwardly so as to rotate the plow lift share 34, to engage the projection 36 of the left loose lever 33 and turn that lever 33 upwardly so as to raise the plow beam 24 by means of the link 32. The plow beam upon reaching the desired elevation will be locked in place by means of a latch mechanism to be later described.

When the plow has reached its desired elevation, the periphery of the drum 37 will contact with the pawl 45 and force its hooked extremity out of engagement with the teeth 38 as shown in position "B", Fig. 5. The spring 51 will now act to snap the spring lever 43 upwardly so as to raise the pawl 45 to the position "C", Fig. 5, thus entirely releasing the lifting mechanism. The lifting mechanism remains in the position "C" until it is desired to drop one of the plows. The plow in dropping will pull the lift shaft 34 back to its former position and in turn pull the pawl back into position "D", Fig. 5.

The depth of the plowing is of course regulated by the height of the forward extremity of the plow beam. This can be regulated by means of a depth lever 53 which is carried on a shaft 54 extending across the transmission case 34, carried in a pair of brackets 55 secured to the transmission case bolts, already in place. The lever 53 is maintained in any desired position by means of a sector 56 supported from a bracket 57 from the fixed frame 20. The shaft 54 carries two forwardly projecting arms 58, from each of which depends a series of links 59 connecting with the forward extremity of the plow beams 24 and 25. Thus, by drawing the lever rearwardly the forward extremities of the plow beams are raised and by forcing the lever forward, the forward extremities of the plow beams are lowered. This provides an efficient and easily operated depth adjustment.

A latch mechanism for holding the plow beams in the raised position is carried by each of the slides 30. Each latch mechanism comprises a latch lever 63, pivoted to one of the slide bolts as indicated at 62, Fig. 3. The latch lever 63 has a pointed extremity 67 adapted to engage in notches 68 in a hanging latch bar 69. The latch bar 69 and the latch lever 63 are held in place by a cross bar 66 secured to the slide 30. A spring 65 is compressed between the extremity of the crossbar 66 and a head 60 formed on a spring bolt 61. The other extremity of the bolt 61 is carried in a clip 64 upon the latch lever 63. This allows the pointed extremity of the latch lever to ride upon the latch bar 69 until one of the notches 68 is reached. The spring 65 will then pull the latch bar down causing its pointed extremity to enter the notch and support the plow beam. To release the plow, the latch lever 63 is lifted to the broken line position of Fig. 3, which releases its extremity 67 from its notch.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. Means for lifting the rearward extremities of plow beams which are pivoted adjacent their forward extremities to a structure supported on wheels, comprising a shaft; levers loosely mounted on said shaft; links connecting the extremities of said levers with said plow beams; second levers fixed to said shaft and adapted, when said shaft is rotated, to contact with said first levers and lift said plow beams and means for rotating said shaft.

2. Means for lifting the rearward extremities of plow beams which are pivoted adjacent their forward extremities to a structure supported on wheels, comprising a shaft; levers loosely mounted on said shaft; links connecting the extremities of said levers with said plow beams; second levers fixed to said shaft and adapted, when said shaft is rotated, to contact with said first levers and lift said plow beams; means for rotating said shaft; said means comprising a toothed, circular member adapted to be secured to one of said wheels; a third fixed lever projecting from said shaft; a hook shaped pawl hinged to the extremity of said third lever; and means for bringing said pawl into engagement with the teeth of said circular member so that rotation of said wheel will cause said pawl to operate said third lever and rotate said shaft.

3. Means for lifting the rearward extremities of plow beams which are pivoted adjacent their forward extremities to a structure supported on wheels comprising a shaft; levers loosely mounted on said shaft; links connecting the extremities of said levers with said plow beams; second levers fixed to said shaft and adapted, when said shaft is rotated, to contact with said first levers and lift said plow beams; means for rotating said shaft, said means comprising a toothed, circular member adapted to be secured to one of said wheels; a third fixed lever projecting from said shaft; a hook shaped pawl hinged to the extremity of said third lever; means for bringing said pawl into engagement with the teeth of said circular member so that rotation of said wheel will cause said pawl to operate said third lever and rotate said shaft; and a projecting surface on said circular member adapted to force said pawl out of engagement with said teeth after said shaft has been rotated.

4. Means for lifting the rearward extremities of plow beams which are pivoted adjacent their forward extremities to a structure supported on wheels comprising a shaft; levers loosely mounted on said shaft; links connecting the extremities of said levers with said plow beams; second levers fixed to said shaft and adapted, when said shaft is rotated, to contact with said first levers and lift said plow beams; means for rotating said shaft, said means comprising a toothed, circular member adapted to be secured to one of said wheels; a third fixed lever projecting from said shaft; a hook shaped pawl hinged to the extremity of said third lever; means for bringing said pawl into engagement with the teeth of said circular member so that rotation of said wheel will cause said pawl to operate said third lever and rotate said shaft, said means comprising a spring lever terminating at its one extremity in a handle and at its other extremity in an arm in engagement with said pawl; and a spring acting to force said pawl away from said circular member so that manual operation of said handle will be required to force said pawl into engagement therewith.

5. A plow adapted to be carried by an automotive wheeled structure comprising plow beams hinged to said structure at their forward extremities, arcuated guides carried by said structure; slides carried by said plow beams and adapted to travel along said guides when said plows are raised; means for raising the rearward extremities of said plow beams comprising a transverse shaft carried by said structure; fixed levers projecting from said shaft; loose levers carried by said shaft; projections on said loose levers adapted to be contacted with by said fixed levers; links connecting said loose levers with said plow beams; latch mechanism adapted to maintain said plow beams in an elevated position; and means for rotating said shaft so as to raise any plow beam which is in lowered position by contact between said fixed levers and said projections.

6. A plow adapted to be carried by an automotive wheeled structure, comprising plow beams hinged to said structure at their forward extremities; arcuated guides carried by said structure; slides carried by said plow beams and adapted to travel along said guides when said plows are raised; means for raising the rearward extremities of said plow beams, comprising a transverse shaft carried by said structure; fixed levers projecting from said shaft; loose levers carried by said shaft; projections on said loose levers adapted to be contacted with by said fixed levers; links connecting said loose levers with said plow beams; latch mechanism adapted to maintain said plow beams in an elevated position; means for rotating said shaft so as to cause contact between said fixed levers and said projections; said means comprising a pawl hinged to the extremity of one of said fixed levers adjacent one of said wheels; a drum adapted to be secured to said wheel; projections in said drum; and means for bringing said pawl into engagement with said projections so that rotation of said wheel will cause said pawl to rotate said shaft.

7. A plow adapted to be carried by an automotive wheeled structure, comprising plow beams hinged to said structure at their forward extremities; arcuated guides carried by said structure; slides carried by said plow beams and adapted to travel along said guides when said plows are raised; means for raising the rearward extremities of said plow beams, comprising a transverse shaft carried by said structure; fixed levers projecting from said shaft; loose levers carried by said shaft; projections on said loose levers adapted to be contacted with by said fixed levers; links connecting said loose levers with said plow beams; latch mechanism adapted to maintain said plow beams in an elevated position; means for rotating said shaft so as to cause contact between said fixed levers and said projections, said means comprising a pawl hinged to the extremity of one of said fixed levers adjacent one of said wheels; a drum adapted to be secured to said wheel; projections in said drum; means for bringing said pawl into engagement with said projections so that rotation of said wheel will cause said pawl to rotate said shaft, said latter means comprising a second shaft; a handle projecting upwardly from said second shaft; an arm projecting from said second shaft through an opening in said pawl; a spring operatively connected to said second shaft so as to cause said arm to hold said pawl out of engagement with said projections and to allow said arm to force said pawl into engagement with said projections when said handle is operated; and automatic means for forcing said pawl out of engagement when rotation of said shaft has been accomplished.

8. In a plow of the type having plow beams carried on wheels, means for raising said plow beams by the rotation of said wheels comprising: a circular toothed structure secured to said wheels; a relatively long hook-shaped pawl adapted to extend partially over said tooth structure; means for causing said pawl to engage one of the teeth therein, the surface of said structure acting to force said pawl out of engagement when said structure has rotated a predetermined distance; an operable connection between said hook-shaped pawl and said plow beams; a lever slidably supporting the free extremity of said hook-shaped pawl; and means for operating said lever so as to cause said pawl to engage said tooth and spring means by operating said lever so as to maintain said pawl out of engagement with said teeth.

9. Means for operating a plow raising mechanism from the plow supporting wheels comprising: drums; projections on said drums arranged to extend between the spokes of said wheels; clamping plates adapted to extend between said projections so as to clamp said drum to said spokes; and cross bars on the periphery of said drum adapted to form ratchet teeth.

10. In a wheeled plow, means for supporting the plow beam in the raised position comprising: a substantially vertical arcuate notched member; a pivoted lever arranged to move with said plow beam; a pointed extremity on said lever arranged to engage said notches; means for movement of said lever in one direction to maintain said pointed extremity in engagement with said notches; and spring means arranged to allow movement of said lever in the other direction to release it from engagement.

In testimony whereof, I affix my signature.

MARTIN B. MONSON.